US009801157B2

(12) United States Patent
Merlin et al.

(10) Patent No.: US 9,801,157 B2
(45) Date of Patent: Oct. 24, 2017

(54) SYSTEM AND METHOD OF IDENTIFYING A LOWER POWER PAGING MODE

(71) Applicant: QUALCOMM Incorporated, San Diego, CA (US)

(72) Inventors: Simone Merlin, San Diego, CA (US); Amin Jafarian, San Diego, CA (US); Santosh Paul Abraham, San Diego, CA (US)

(73) Assignee: QUALCOMM, Incorporated, San Diego, CA (US)

( * ) Notice: Subject to any disclaimer, the term of this patent is extended or adjusted under 35 U.S.C. 154(b) by 0 days.

(21) Appl. No.: 13/779,313

(22) Filed: Feb. 27, 2013

(65) Prior Publication Data
US 2014/0120962 A1 May 1, 2014

Related U.S. Application Data

(60) Provisional application No. 61/720,913, filed on Oct. 31, 2012.

(51) Int. Cl.
H04W 4/12 (2009.01)
H04W 68/02 (2009.01)
H04W 84/12 (2009.01)

(52) U.S. Cl.
CPC ............ H04W 68/02 (2013.01); H04W 84/12 (2013.01); Y02B 60/50 (2013.01)

(58) Field of Classification Search
CPC ...... H04L 67/22; H04W 68/02; H04W 52/02; H04W 84/02; H04W 52/0235;
(Continued)

(56) References Cited

U.S. PATENT DOCUMENTS 5,754,069 A 5/1998 Nagaraj
6,075,994 A 6/2000 Bhat
(Continued)

FOREIGN PATENT DOCUMENTS

EP 2273828 B1 1/2012

OTHER PUBLICATIONS

IEEE Std 802.11, "IEEE Standard for Information technology—Telecommunications and information exchange between systems—Local and metropolitan area networks—Specific requirements Part 11: Wireless LAN Medium Access Control (MAC) and Physical Layer (PHY) Specifications," LAN/MAN Committee of the IEEE Computer Society, 1999, 528 pages.

Primary Examiner — Charles C Jiang
Assistant Examiner — Rose Clark
(74) Attorney, Agent, or Firm — Holland & Hart LLP

(57) ABSTRACT

Systems, methods, and devices for communicating data in a wireless communications network are described herein. In some aspects, a station includes a first receiver and a low power circuit including a second receiver. The second receiver may be configured to consume less power than the first receiver. The second receiver receives short paging messages from another wireless device, such as an access point. The paging messages may trigger transitions of the first receiver from inactive doze or sleep states to active awake states based on Traffic Information Maps. Once in the awake state, the first receiver receives messages. This enables the first receiver to reduce the time spent awake, thereby reducing power consumption. A system and method for identifying and managing paging modes is described herein.

46 Claims, 7 Drawing Sheets

(58) Field of Classification Search
CPC . H04W 52/0274; H04W 12/02; H04W 12/04; H04W 16/00; H04W 16/24; H04W 28/044; H04W 28/06; H04W 4/005; H04W 4/008; H04W 4/06; H04W 4/12; H04W 40/02; H04W 48/02; H04W 48/08; H04W 48/16; H04W 52/0206; H04W 52/0209; H04W 52/0212; H04W 52/0216; H04W 52/0225; H04W 52/0229; H04W 60/04; H04W 60/06; H04W 68/00; H04W 68/025; H04W 68/06; H04W 68/12; H04W 72/005; H04W 72/02; H04W 72/04; H04W 72/0446; H04W 72/085; H04W 72/121; H04W 72/1289; H04W 74/004; H04W 74/04; H04W 74/06; H04W 74/08; H04W 74/085; H04W 74/0875; H04W 76/021; H04W 76/023; H04W 76/046; H04W 76/048; H04W 8/005; H04W 8/186; H04W 8/205; H04W 8/26; H04W 80/00; H04W 84/022; H04W 84/025; H04W 84/12; H04W 84/18; H04W 88/02; H04W 88/08; H04W 8/185; H04W 92/02; H04W 4/08; H04W 52/00; H04W 52/0219; H04W 52/028; H04W 74/002; Y02B 60/50

USPC ...... 455/458, 466, 574, 404.1, 426.1, 562.1, 455/13.1, 427, 500, 502, 514, 515, 517, 455/522, 524, 127.5, 13.4, 343.1, 343.2, 455/41.2, 433, 435.1, 503, 553.1, 556.1, 455/561; 370/311, 338, 328, 336, 329, 370/335, 318, 337, 254, 255, 310, 310.2, 370/312, 314, 346

See application file for complete search history.

(56) References Cited

U.S. PATENT DOCUMENTS

| | | | |
|---|---|---|---|
| 6,215,980 B1 | 4/2001 | Kim | |
| 6,990,362 B2 | 1/2006 | Simpson et al. | |
| 8,311,053 B2 | 11/2012 | Choi | |
| 2005/0037781 A1 | 2/2005 | Ozugur et al. | |
| 2005/0186973 A1* | 8/2005 | Gaal et al. | 455/458 |
| 2007/0008915 A1* | 1/2007 | Kim et al. | 370/311 |
| 2007/0149257 A1 | 6/2007 | Cheresh et al. | |
| 2008/0095268 A1* | 4/2008 | Aldana | 375/299 |
| 2008/0146253 A1* | 6/2008 | Wentink | 455/458 |
| 2008/0181154 A1* | 7/2008 | Sherman | 370/311 |
| 2008/0181155 A1 | 7/2008 | Sherman et al. | |
| 2009/0003252 A1* | 1/2009 | Salomone et al. | 370/311 |
| 2009/0137206 A1* | 5/2009 | Sherman et al. | 455/41.2 |
| 2010/0003935 A1* | 1/2010 | Behzad et al. | 455/132 |
| 2010/0061326 A1* | 3/2010 | Lee et al. | 370/329 |
| 2010/0142426 A1* | 6/2010 | Taniuchi et al. | 370/311 |
| 2010/0167686 A1* | 7/2010 | Pan | 455/404.1 |
| 2010/0190514 A1* | 7/2010 | Laroia et al. | 455/458 |
| 2011/0211511 A1* | 9/2011 | Bakthavathsalu et al. | 370/311 |
| 2011/0274021 A1 | 11/2011 | He et al. | |
| 2012/0106423 A1 | 5/2012 | Nylander et al. | |
| 2012/0120859 A1* | 5/2012 | Stephens et al. | 370/311 |
| 2012/0250731 A1 | 10/2012 | Taghavi Nasrabadi et al. | |
| 2012/0263086 A1* | 10/2012 | Liu | H04W 52/0216 370/311 |
| 2012/0294218 A1* | 11/2012 | Lee et al. | 370/311 |
| 2013/0077610 A1* | 3/2013 | Amini | H04W 52/0216 370/338 |
| 2013/0188541 A1* | 7/2013 | Fischer | H04W 52/0229 370/311 |
| 2013/0196673 A1* | 8/2013 | Smadi et al. | 455/450 |
| 2013/0223305 A1* | 8/2013 | Doppler et al. | 370/311 |
| 2013/0223419 A1* | 8/2013 | Ghosh et al. | 370/338 |
| 2013/0272137 A1* | 10/2013 | Kwon | H04W 72/042 370/241 |
| 2013/0294261 A1* | 11/2013 | Ghosh | H04W 28/14 370/252 |
| 2014/0029494 A1* | 1/2014 | Sundaram et al. | 370/311 |
| 2014/0071900 A1* | 3/2014 | Park | H04W 74/04 370/329 |
| 2014/0092797 A1* | 4/2014 | Chu et al. | 370/311 |
| 2014/0098724 A1* | 4/2014 | Park | H04W 72/042 370/311 |
| 2014/0112226 A1 | 4/2014 | Jafarian | |
| 2014/0112266 A1* | 4/2014 | Seok | 370/329 |
| 2014/0185501 A1* | 7/2014 | Park et al. | 370/311 |

* cited by examiner

| ELEMENT ID | LENGTH | PAGING BROADCAST INTERVAL | CONTROL | MIN OFFSET | MAX OFFSET |
|---|---|---|---|---|---|
| 604 | 608 | 612 | 616 | 620 | 624 |

| ELEMENT ID | LENGTH | STATUS | PAGING BROADCAST INTERVAL | PAGING BROADCAST OFFSET | HIGH RATE LIMIT | LOW RATE LIMIT | GID(S) |
|---|---|---|---|---|---|---|---|
| 704 | 706 | 712 | 716 | 720 | 724 | 728 | 732 |

SYSTEM AND METHOD OF IDENTIFYING A LOWER POWER PAGING MODE

CROSS REFERENCE TO RELATED APPLICATIONS

This application claims the benefit of U.S. Provisional Application No. 61/720,913, filed Oct., 31, 2012, entitled "SYSTEM AND METHOD OF IDENTIFYING PAGING MODE," the disclosure of which is hereby incorporated by reference in its entirety.

BACKGROUND

Field

The present application relates generally to wireless communications, and more specifically to systems, methods, and devices for communicating very short paging messages for wireless receivers.

Background

In many telecommunication systems, communications networks are used to exchange messages among several interacting spatially-separated devices. Networks may be classified according to geographic scope, which could be, for example, a metropolitan area, a local area, or a personal area. Such networks would be designated respectively as a wide area network (WAN), metropolitan area network (MAN), local area network (LAN), wireless local area network (WLAN), or personal area network (PAN). Networks also differ according to the switching/routing technique used to interconnect the various network nodes and devices (e.g. circuit switching vs. packet switching), the type of physical media employed for transmission (e.g. wired vs. wireless), and the set of communication protocols used (e.g. Internet protocol suite, SONET (Synchronous Optical Networking), Ethernet, etc.).

Wireless networks are often preferred when the network elements are mobile and thus have dynamic connectivity needs, or if the network architecture is formed in an ad hoc, rather than fixed, topology. Wireless networks employ intangible physical media in an unguided propagation mode using electromagnetic waves in the radio, microwave, infra-red, optical, etc. frequency bands. Wireless networks advantageously facilitate user mobility and rapid field deployment when compared to fixed wired networks.

The receivers in a wireless network may consume a large amount of power during packet reception or while waiting to receive packets. Thus, improved systems, methods, and devices for communicating in a wireless network are desired.

SUMMARY

The systems, methods, and devices of the invention each have several aspects, no single one of which is solely responsible for its desirable attributes. Without limiting the scope of this invention as expressed by the claims which follow, some features will now be discussed briefly. After considering this discussion, and particularly after reading the section entitled "Detailed Description" one will understand how the features of this invention provide advantages that include improved communications between access points and stations in a wireless network.

One aspect of the disclosure provides for an apparatus for wireless communications. The apparatus includes a receiver configured to receive a request for a paging message, the paging message being one of a plurality of types of paging messages. The apparatus also includes a processing system configured to generate the paging message. The apparatus also includes a transmitter configured to transmit the paging message.

Another aspect of the disclosure provides for an apparatus for wireless communications. The apparatus includes a transmitter configured to transmit a request for a paging message, the paging message being one of a plurality of types of paging messages. The apparatus also includes a receiver configured to receive the requested type of paging message.

Another aspect of the disclosure provides for a method of wireless communications. The method includes receiving a request for a paging message, the paging message being one of a plurality of types of paging messages. The method also includes generating the paging message. The method also includes transmitting the paging message.

Another aspect of the disclosure provides for a method of wireless communication, the method including transmitting a request for a paging message, the paging message being one of a plurality of types of paging messages. The method also includes receiving the paging message.

Another aspect of the disclosure provides for a computer program product comprising a computer readable medium encoded thereon with instructions that when executed cause an apparatus to perform a method of wireless communication. The method includes receiving a request for a paging message, the paging message being one of a plurality of types of paging messages. The method also includes generating the paging message. The method also includes transmitting the paging message.

Another aspect of the disclosure provides for a computer program product comprising a computer readable medium encoded thereon with instructions that when executed cause an apparatus to perform a method of wireless communication. The method includes transmitting a request for a paging message, the paging message being one of a plurality of types of paging messages. The method also includes receiving the paging message.

Another aspect of the disclosure provides for an apparatus for wireless communication. The apparatus includes a means for receiving a request for a paging message, the paging message being one of a plurality of types of paging messages. The apparatus also includes a means for generating the paging message. The apparatus also includes a means for transmitting the paging message.

Another aspect of the disclosure provides for an apparatus for wireless communication, including means for transmitting a request for a paging message, the paging message being one of a plurality of types of paging messages. The apparatus also includes means for receiving the paging message.

Another aspect of the disclosure provides for an access point comprising at least one antenna. The access point also comprises a receiver configured to receive, via the at least one antenna, a request for a paging message, the paging message being one of a plurality of types of paging messages. The access point also comprises a processing system configured to generate the paging message. The access point also comprises a transmitter configured to transmit, via the at least one antenna, the paging message.

Another aspect of the disclosure provides for an access terminal comprising at least one antenna. The access point also comprises a transmitter configured to transmit, via the at least one antenna, a request for a paging message, the paging message being one of a plurality of types of paging

BRIEF DESCRIPTION OF THE DRAWINGS

FIG. 6 is a block diagram illustrating an exemplary paging mode request.

FIG. 7 is a block diagram illustrating an exemplary paging mode response.

DETAILED DESCRIPTION

Figure 1:
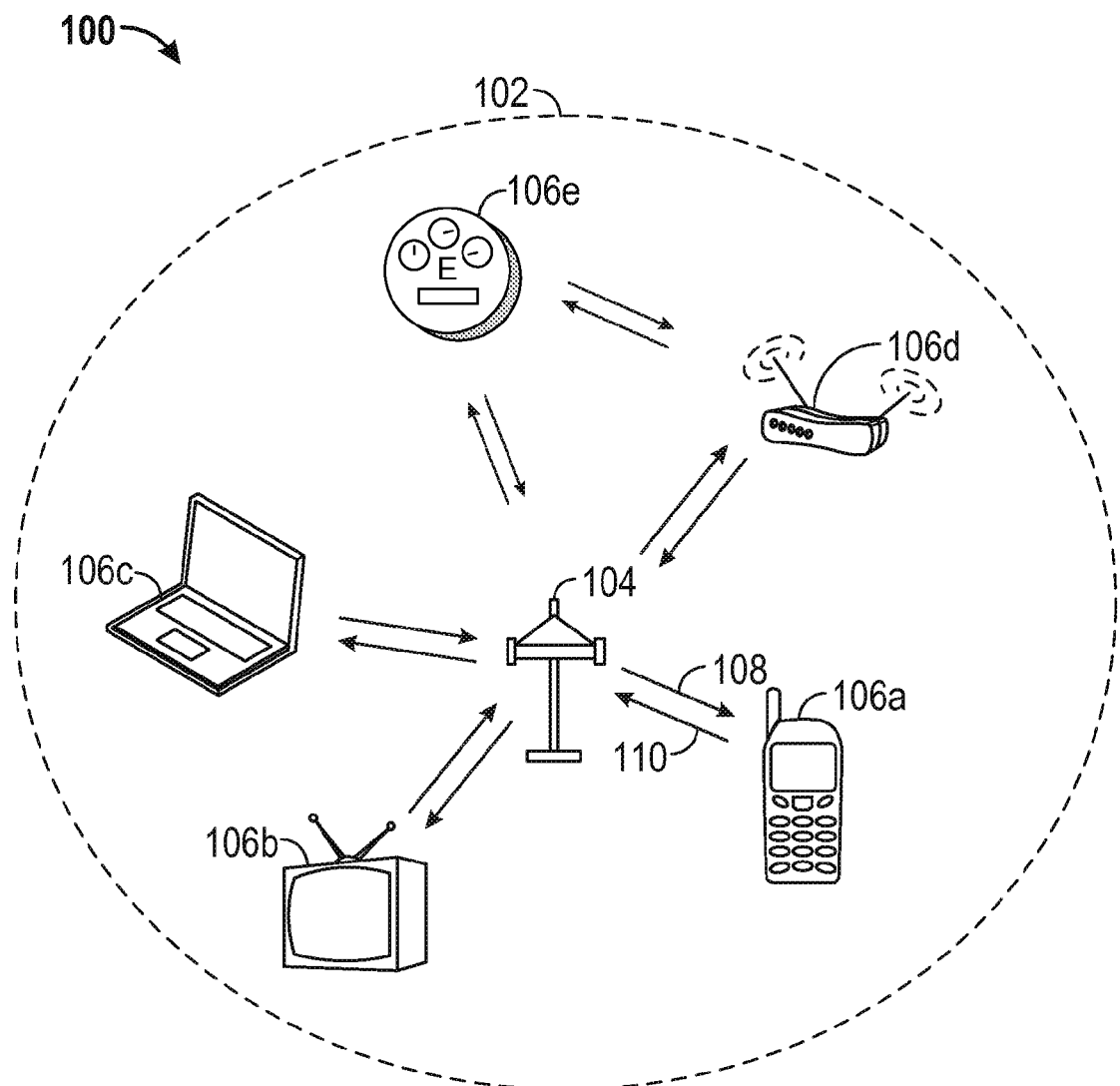
FIG. 1 shows an example of a wireless communication system in which aspects of the present disclosure may be employed.

Various aspects of the novel systems, apparatuses, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of, or combined with, any other aspect of the invention. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Popular wireless network technologies may include various types of wireless local area networks (WLANs). A WLAN may be used to interconnect nearby devices together, employing widely used networking protocols. The various aspects described herein may apply to any communication standard, such as a wireless protocol.

In some aspects, wireless signals in a sub-gigahertz band may be transmitted according to the 802.11ah protocol using orthogonal frequency division multiplexed (OFDM), direct-sequence spread spectrum (DSSS) communications, a combination of OFDM and DSSS communications, or other schemes. Implementations of the 802.11ah protocol may be used for sensors, metering, and smart grid networks. Advantageously, aspects of certain devices implementing the 802.11ah protocol may consume less power than devices implementing other wireless protocols, and/or may be used to transmit wireless signals across a relatively long range, for example about one kilometer or longer.

In some implementations, a WLAN includes various devices which are the components that access the wireless network. For example, there may be two types of devices: access points ("APs") and clients (also referred to as stations, or "STAs"). In general, an AP may serve as a hub or base station for the WLAN and an STA serves as a user of the WLAN. For example, an STA may be a laptop computer, a personal digital assistant (PDA), a mobile phone, etc. In an example, an STA connects to an AP via a Wi-Fi (e.g., IEEE 802.11 protocol such as 802.11ah) compliant wireless link to obtain general connectivity to the Internet or to other wide area networks. In some implementations an STA may also be used as an AP.

An access point ("AP") may also comprise, be implemented as, or known as a NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, or some other terminology.

A station "STA" may also comprise, be implemented as, or known as an access terminal ("AT"), a subscriber station, a subscriber unit, a mobile station, a remote station, a remote terminal, a user terminal, a user agent, a user device, user equipment, or some other terminology. In some implementations an access terminal may comprise a cellular telephone, a cordless telephone, a Session Initiation Protocol ("SIP") phone, a wireless local loop ("WLL") station, a personal digital assistant ("PDA"), a handheld device having wireless connection capability, or some other suitable processing device connected to a wireless modem. Accordingly, one or more aspects taught herein may be incorporated into a phone (e.g., a cellular phone or smartphone), a computer (e.g., a laptop), a portable communication device, a headset, a portable computing device (e.g., a personal data assistant), an entertainment device (e.g., a music or video device, or a satellite radio), a gaming device or system, a global positioning system device, or any other suitable device that is configured to communicate via a wireless medium.

As discussed above, certain of the devices described herein may implement the 802.11ah standard, for example. Such devices, whether used as an STA or AP or other device, may be used for smart metering or in a smart grid network. Such devices may provide sensor applications or be used in home automation. The devices may instead or in addition be used in a healthcare context, for example for personal healthcare. They may also be used for surveillance, to enable extended-range Internet connectivity (e.g. for use with hotspots), or to implement machine-to-machine communications.

Wireless devices consume power when transmitting or receiving signals. Certain of the devices described herein operate in a plurality of states with differing capabilities and different levels of power consumption. For example, receivers consume more power in an awake state, during which time receiver circuits are activated and may receive incoming signals, or in a doze state during which time circuits are not activated and don't receive incoming signals. Reducing the amount of time that receivers are in an awake state and waiting to receive incoming signals reduces power consumption.

Wireless devices employ various power management modes to manage operational states. These power management modes include "Active", where the device is always in an Awake state, "Normal Power Save", where the device can be either in an Awake state or a Doze state, or "Power save with ultra low power" (PS-ULP), where the device can be in Awake state or a Low Power state which may save more power than when the device is in a Doze state. While the implementations described herein that relate to using a paging message that may be received by a low power receiver (that is, a second receiver in a device) may be applicable to many different power modes of operating a wireless device, for clarity of the disclosure, the examples of certain implementations described herein generally relate to using a Normal Power Save mode.

One way to reduce the time that a receiver STA is awake is to transition the receiver to doze state for most of the time, except for those short intervals of time agreed with the transmitter when signals may be sent from the transmitter to the receiver. This is neither flexible nor efficient because in typical applications, the traffic pattern is unpredictable. The agreed awake time may not match the traffic pattern, so some awake times may not correspond to transmit times. There may also be times when transmitted signals are not received because they are transmitted outside of the agreed awake time.

A more flexible and effective approach is for the receiver to doze until a trigger event triggers the receiver to transition to awaken. In some implementations, the trigger event is generated when a circuit receives a wake-up wireless signal. Power consumption is reduced in cases where the wake-up signal is configured so that circuitry that receives the wake-up signal is a simple and low power receiver. The low power receiver (sometimes referred to as a "wake-up receiver") is configured to consume less energy than the regular data receiver to reduce overall power consumption of the wireless device.

In one implementation, a STA's regular data receiver is in doze state. A transmitter (e.g., of an AP or other STA) wirelessly sends a signal to the STA's low power receiver. The STA's low power receiver receives the wireless signal and performs some action. For example, the action may be to wake-up the STA's regular data receiver (either immediately or at a specified time or time delay) to an awake state such that the STA's regular receiver can receive data. In some cases, the STA then sends a message to inform an AP or another STA that it is awake. Then, an AP or STA may send data to the STA's regular receiver, and it is received and processed by the STA.

For some devices, the wireless signal received by the low power receiver (sometimes referred to as an "ultra low-power receiver" or "radio frequency (RF) wakeup circuit") may be a short paging message ("page"), wake-up packet, or an ultra low power (ULP) message. In some implementations in this disclosure, protocols are identified for using such signals or pages to conserve power. This may be in the context of a plurality of power save mode protocols including but not limited to regular PS protocol and U-APSD. Implementations of the timing of the pages, potentially with respect to a beacon, related setup signaling, and page formats are also disclosed.

This disclosure identifies a protocol for the use of ULP messages in conjunction with regular Power Save (PS) mode protocol, which uses beacons and PS-Polls/trigger frames, depending on whether U-APSD is used. This may be in the context of a plurality of power save mode protocols including but not limited to PS-ULP, regular PS protocol, and U-APSD. This disclosure describes potential timing of the ULP messages with respect to beacons, and related setup signaling. This disclosure also describes state transitions of the STA depending on some combination of initial state, power saving mode (for example, PS-ULP mode), and signals received or transmitted.

There may be multiple formats of the short page message including but not limited to 1 MHz PHY preamble, 2 MHz PHY preamble, or short control frame with various transmission rates. Different formats may be suitable for different scenarios. The STA may ask the AP to use a specific one as a paging message. The format of the short paging signal is agreed between AP and STA.

In such implementations, the format, content, and definition of the transmitted and received ULP messages that are received by the low power receiver of a wireless device are known by the transmitting and receiving wireless devices so that the receiver can identify and parse incoming ULP messages. In some implementations, after identifying and parsing the incoming ULP message, the AP or other STA may send a ULP message at certain target times and/or time intervals. In some implementations, the receiving STA can use a simple and low power receiver circuit designed to receive certain ULP messages of expected configurations and content. Receiving STAs may be further configured to reduce power additional power consumption by a power saving scheme that places the wake-up circuit different operational states, such as ultra low power, doze, or awake. In some cases, these states may correspond to the states employed by the STA's regular data receivers and transceivers.

For some implementations, power is conserved by maximizing the time analog and digital circuits are in an off or sleep state. For some implementations, different circuits within the wireless device may be in different states. For example, the regular data receiver may be in doze state, while a ULP receiver may be awake to receive ULP messages.

For some implementations, the RF wake-up circuit selectively receives a particular RF signal structure. When detected, the RF wake-up circuit activates the STA's regular data receivers and transceivers. These regular receivers may contain analog and/or digital circuitry.

In some implementations, state transitions are not instantaneous. For example, when the transceiver is powered on, it may take several hundred microseconds to wake-up a primary receiver, largely due to phase locked loop (PLL) convergence time, loading of calibration coefficients, and time to load registers. When the transceiver is fully powered off, wake-up time could take several milliseconds. In some implementations, sufficient time is allocated and medium reserved to allow for state transition time.

In some implementations, the low-power receiver is a separate module from the wireless device's primary transceiver. In other implementations, they are in the same module.

For some implementations, a STA operates in Active mode, with a single Awake state. For other implementations, a STA operates in regular PS mode, with two operational states: Awake and Doze.

For some implementations, a STA operates in Power Save-Ultra Low Power (PS-ULP) mode. For some implementations of STAs operating in PS-ULP mode, the STA may transition among three operational states: Awake, Doze, or ULP. Transitions from Doze state to Awake state, or Awake state to Doze state may use the existing PS mode transition conventions. When transitioning from Doze state to Awake state, the STA may send a PS-Poll or a trigger frame to an AP and indicate it's ready to receive data. When transitioning from Awake state to Doze state, the AP indicates that the STA may go to sleep. In some implementations, the AP sets a More Data parameter to false. In other implementations, the AP sets an End of Service Parameter to true. Similar mechanisms may be employed in other implementations. This disclosure describes various implementations associated with transitions from doze state to ULP state, from ULP state to awake state, from ULP state to doze state, and from awake state to ULP state.

In some implementations, the ULP circuit may not be active all times; ULP circuits typically need to be cycled off periodically. This disclosure describes protocols that enable the AP and STA to coordinate and communicate state transitions. Some aspects of these protocols are integrated with existing power save mode mechanisms. This reduces changes to existing specifications.

In some implementations, pages or ULP messages coexist with beacons. They may be repeated with the same or a different duty cycle as beacons. In other implementations, pages may replace beacons.

In some implementations, pages or ULP messages include duration parameters that can be used to reduce contention. For example, timeslots can be dedicated to one or several STAs for uplink and/or downlink transmissions during the period of duration, or other purposes during the duration set, during the wake-up protocol.

In some implementations, pages or ULP messages instruct wireless device to transition the primary receiver to sleep. This reduces battery consumption, and may be used when the AP does not have any BUs for the STA.

Wireless devices including APs may send pages or ULP messages for timing synchronization with one or more devices including STAs. For example, a page with a "no data" message can be sent for synchronization.

Pages sent between wireless devices may also provide information about the communications medium, changes in protocol, changes in identification parameters, changes in the target beacon transit time (TBTT), or other similar information.

In such implementations, the page format, content, and definition of transmitted pages are known by the transmitting and receiving wireless devices so that the receiver can identify and parse incoming pages. In some implementations, the AP or other STA would send a page at certain target times and/or time intervals. In some implementations, other messages may not be sent to the STA at that time. By sending known and agreed to short paging messages at target times, the receiving STA can use a simple and low power receiver circuit designed to receive certain pages of expected configurations and content. Receiving STAs may be further configured to reduce power consumption by a power saving scheme that places the wake-up circuit in a doze or in an awake state. In some implementations, such doze and awake states may be similar to, or the same as, doze and awake states employed for a STA's regular data receivers and transceivers.

In some implementations, the page received by the low power receiver may be a Null Data Packet (NDP) Control frame consisting of a PHY preamble only. The page can include wake-up information in a SIG field of the frame. In other implementations, the page may be a MAC frame. MAC frame examples include a regular ACK with More Data set to 1, a QoS-CF-ACK frame, or another short MAC frame. These, and similar short message lengths, and well defined, finite sets of pages, enable decoding circuitry with simpler logic, less memory and less expensive clocks than is possible with longer message, less well defined, or a larger set of inputs. Such circuitry may be optimized to receive and decode the pages in implementations optimized to reduce power consumption, use less memory, and/or a simpler clock than the primary STA receiver that receives beacons and BUs. Such implementations reduce signal length and receive power consumed, thereby increasing battery life. The circuitry in a STA to receive and decode pages may be implemented as a separate receiver integrated with other circuitry.

The STA coordinate with the AP on an agreed target wakeup time to receive these paging messages. In one example, a very short paging message is an NDP control frame. The control frame includes a (partial) AID of the STA being paged. The control frame also includes a bit indicating where there is a BU for the STA. In some cases, the control frame includes synchronization information such as a plurality of LSBs of timestamp. The pages are received at target wakeup times (TWTs), and beacons at TBTTs.

In this example, the STA only needs to decode a short NDP control frame. For some implementations, it takes less than one third as long to decode NDP control frames than beacons. For example, over 1.5 ms to decode a short beacon and more than three times as short a time to decode an NDP control frame. As an alternative, the STA can be configured to detect the type of messages described below with respect to FIGS. 5A and 5B.

In some implementations, it is possible that at any point in time, only one STA needs to be paged. In some implementations, different STAs may be assigned different or nearby TWTs. In some implementations, multiple STAs may be assigned the same TWT. A group AID may be defined to page multiple STAs. Multiple NDPs may be sent in sequence targeting one STA each.

FIG. 1 shows an exemplary wireless communication system 100 in which aspects of the present disclosure may be employed. The wireless communication system 100 may operate pursuant to a wireless standard, for example the 802.11ah standard. The wireless communication system 100 may include an AP 104, which communicates with STAs 106.

A variety of processes and methods may be used for transmissions in the wireless communication system 100 between the AP 104 and the STAs 106. For example, signals may be sent and received between the AP 104 and the STAs 106 in accordance with OFDM/OFDMA techniques. If this is the case, the wireless communication system 100 may be referred to as an OFDM/OFDMA system. Alternatively, signals may be sent and received between the AP 104 and the STAs 106 in accordance with CDMA techniques. If this is the case, the wireless communication system 100 may be referred to as a CDMA system.

A communication link that facilitates transmission from the AP 104 to one or more of the STAs 106 may be referred to as a downlink (DL) 108, and a communication link that facilitates transmission from one or more of the STAs 106 to the AP 104 may be referred to as an uplink (UL) 110. Alternatively, a downlink 108 may be referred to as a forward link or a forward channel, and an uplink 110 may be referred to as a reverse link or a reverse channel.

The AP 104 may act as a base station and provide wireless communication coverage in a basic service area (BSA) 102. The AP 104 along with the STAs 106 associated with the AP 104 and that use the AP 104 for communication may be referred to as a basic service set (BSS). It should be noted that the wireless communication system 100 may not have a central AP 104, but rather may function as a peer-to-peer network between the STAs 106. Accordingly, the functions of the AP 104 described herein may alternatively be performed by one or more of the STAs 106.

The AP 104 may transmit a beacon signal (or simply a "beacon"), via a communication link such as the downlink 108, to other nodes STAs 106 of the system 100, which may help the other nodes STAs 106 to synchronize their timing with the AP 104, or which may provide other information or functionality. Such beacons may be transmitted periodically. In one aspect, the period between successive transmissions may be referred to as a superframe. Transmission of a beacon may be divided into a number of groups or intervals. In one aspect, the beacon may include, but is not limited to, such information as timestamp information to set a common clock, a peer-to-peer network identifier, a device identifier, capability information, a superframe duration, transmission direction information, reception direction information, a neighbor list, and/or an extended neighbor list, some of which are described in additional detail below. Thus, a beacon may include information both common (e.g. shared) amongst several devices, and information specific to a given device.

The AP 104 may transmit a short page message signal (or simply a "page"), via a communication link such as the downlink 108, to other nodes STAs 106 of the system 100, which may help the other nodes STAs 106 to synchronize their timing with the AP 104, or which may provide other information or functionality. Such pages may be transmitted periodically. In one aspect, the period between successive transmissions may be referred to as a page superframe. Transmission of a page may be divided into a number of groups or intervals. In one aspect, the page may include, but is not limited to, such information as the time to wake-up the receiver, the time to put a receiver to sleep, or duration information, timestamp information to set a common clock, a peer-to-peer network identifier, a device identifier, capability information, a page superframe duration, transmission direction information, and/or reception direction information, some of which are described in additional detail below. Thus, a page may include information both common (e.g. shared) amongst several devices, and information specific to a given device. Short page message signals may also be referred to as low power signals, ultra low power signals, or messages, or packets.

In some aspects, a STA 106 may be required to associate with the AP 104 in order to send communications to and/or receive communications from the AP 104. In one aspect, information for associating is included in a beacon broadcast by the AP 104. To receive such a beacon, the STA 106 may, for example, perform a broad coverage search over a coverage region. A search may also be performed by the STA 106 by sweeping a coverage region in a lighthouse fashion, for example. After receiving the information for associating, the STA 106 may transmit a reference signal, such as an association probe or request, to the AP 104. In some aspects, the AP 104 may use backhaul services, for example, to communicate with a larger network, such as the Internet or a public switched telephone network (PSTN).

Accordingly, in certain wireless communication systems 100, the AP 104 may transmit paging messages to a plurality of STAs 106 that are in a power save mode, the paging messages indicating whether or not there is data buffered at the AP 104 for the STAs 106. The STAs 106 may use this information to determine when to transition to an awake state or a doze state. For example, if an STA 106 determines it is not being paged, it may enter a doze state. Alternatively, if the STA 106 determines it may be paged, the STA 106 may enter an awake state for a certain period of time to receive the page and further determine when to be in an awake state based on the page. Further, the STA 106 may stay in the awake state for a certain period of time after receiving the page. In another example, the STA 106 may be configured to function in other ways when being paged or not being paged that are consistent with this disclosure.

In some aspects, paging messages may include a bitmap (not shown in this figure), such as a traffic identification map (TIM). In certain such aspects, the bitmap may include a number of bits. These paging messages may be sent from the AP 104 to STAs 106 in a beacon or a TIM frame. Each bit in the bitmap may correspond to a particular STA 106 of a plurality of STAs 106, and the value of each bit (e.g., 0 or 1) may indicate the state the corresponding STA 106 should be in (e.g., doze state or awake state) to be able to receive Buffered Units (BUs) that the AP 104 has for that particular STA 106. Accordingly, the size of the bitmap may be directly proportional to the number of STAs 106 in the wireless communications system 100. Therefore, a large number of STAs 106 in the wireless communications system 100 may result in a large bitmap.

In some aspects, STAs 106 that sleep for a long time may not wake up to read an incoming TIM broadcast message. For example, a STA 106 may be configured to sleep through one or more TIM messages in an extended sleep mode. In this case, the STA 106 may previously have advertised to the AP 104 that the STA 106 may not read any TIM messages. Accordingly, the AP 104 may not include the corresponding identifiers in the TIM message. In various implementations, the STAs 106 can notify the AP 104 that they may not wake up for one or more TIM messages (e.g. that they are operating in the aforementioned power saving mode) using a control message, or immediately during association.

For STAs 106 that have notified the AP 104 in this manner, the AP 104 may not include identifiers in the TIM message, even when it has BUs intended for them. STAs 106 may claim their BUs by sending a PS-Poll at any time to the AP 104. In an implementation, AP 104 may immediately send the BU in response to the PS-Poll. In another implementation, the AP 104 may respond to the PS-Poll with an ACK, and deliver the BU at a later time. In yet another implementation, the AP 104 may not immediately respond (neither with ACK nor with BU) to a PS-Poll. The AP 104 may instead reply with a Cumulative ACK frame sent after a given scheduled time after the TIM message.

In various implementations, the STA 106 can specify the waiting time to deliver the BU via the PS-Poll (for a dynamic indication), an association request, a probe request, and/or another management frame sent to the AP 104 (for a static indication). In other implementations, the AP 104 can specify the waiting time to deliver the BU via an acknowledgement (ACK or ack) frame, a TIM element (for a dynamic indication), a beacon, an association response, a probe response, or other management frames sent to the STA 106 (for a static indication). The STA 106 may go to sleep for the waiting time duration. The STA 106 may acknowledge correct reception of the BU by sending an ACK. The STA 106 may then go back to sleep.

Figure 2:
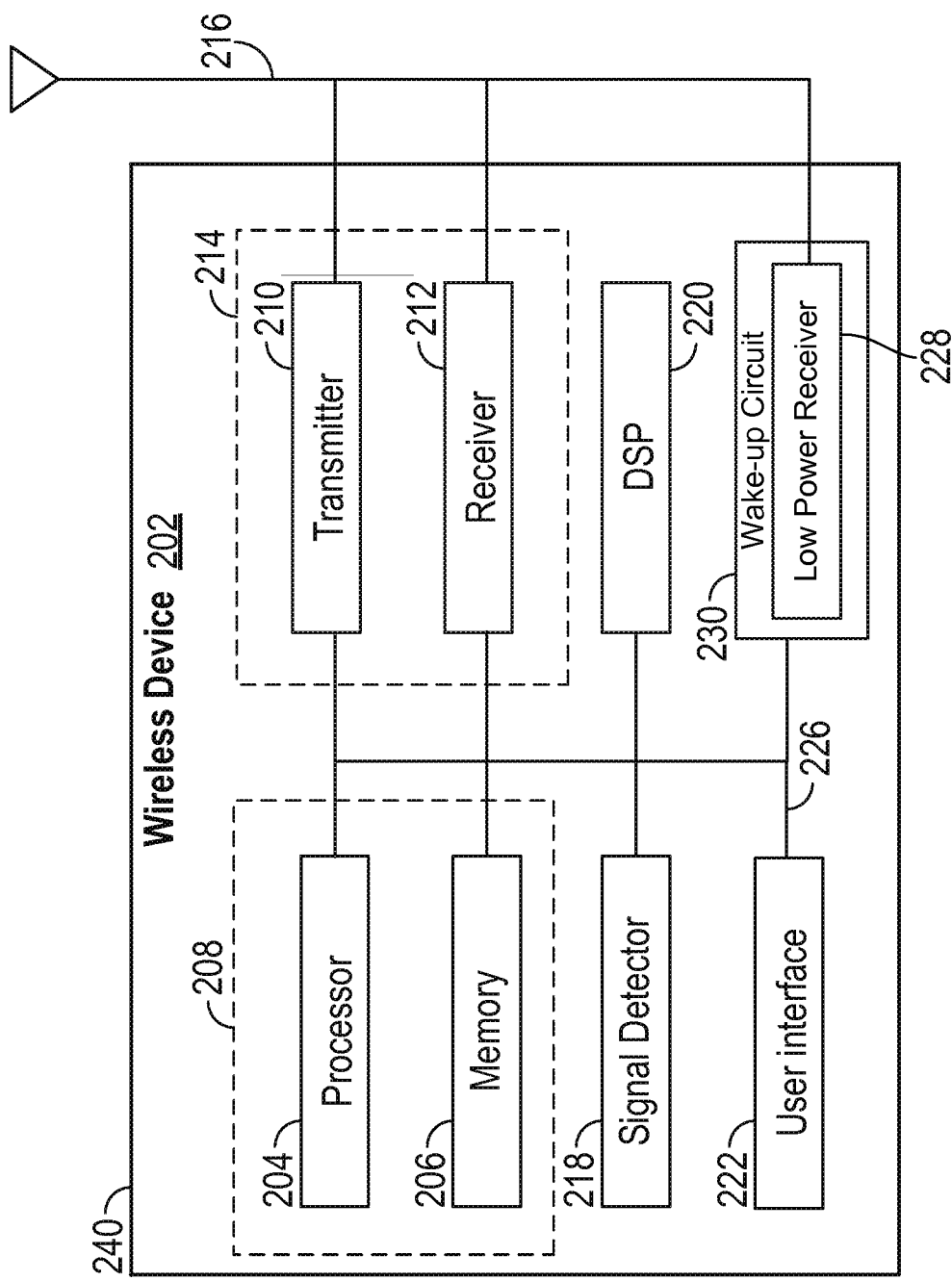
FIG. 2 illustrates a block diagram of an example of a wireless device that may be employed within the wireless communication system of FIG. 1.

FIG. 2 shows an exemplary functional block diagram of a wireless device 202 that may be employed within the wireless communication system 100 of FIG. 1. The wireless device 202 is an example of a device that may be configured to implement the various methods described herein. For example, the wireless device 202 may comprise the AP 104, one of the STAs 106.

The wireless device 202 may include a processing system 208 comprising a processor 204 and memory 206. In some implementations, the processing system 208 may further comprise a signal detector 218 and/or a DSP 220. The processor 204 controls operation of the wireless device 202. The processor 204 may also be referred to as a central processing unit (CPU). Memory 206, which may include both read-only memory (ROM) and random access memory (RAM), may provide instructions and data to the processor 204. A portion of the memory 206 may also include non-volatile random access memory (NVRAM). The processor 204 typically performs logical and arithmetic operations based on program instructions stored within the memory 206. The instructions in the memory 206 may be executable to implement the methods described herein.

The processor 204 may comprise or be a component of a processing system 208 implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

In some cases, a means for generating may include the processing system 208. In some cases, a means for generating may include the processor 204. In some cases, a means for encoding may include the processing system 208. In some cases, a means for encoding may include the processor 204.

The processing system 208 may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system 208 to perform the various functions described herein.

When the wireless device 202 is implemented or used as a transmitting node, the processor 204 may be configured to select one of a plurality of media access control (MAC) header types, and to generate a packet having that MAC header type. For example, the processor 204 may be configured to generate a packet comprising a MAC header and a payload and to determine what type of MAC header to use, as discussed in further detail below.

When the wireless device 202 is implemented or used as a receiving node, the processor 204 may be configured to process packets of a plurality of different MAC header types. For example, the processor 204 may be configured to determine the type of MAC header used in a packet and process the packet and/or fields of the MAC header accordingly as further discussed below.

The wireless device 202 may also include a housing 240 that may include a transmitter 210 and/or a receiver 212 to allow transmission and reception of data between the wireless device 202 and a remote location. The transmitter 210 and receiver 212 may be combined into a transceiver 214. An antenna 216 may be attached to the housing 240 and electrically coupled to the transceiver 214. The wireless device 202 may also include (not shown) multiple transmitters, multiple receivers, multiple transceivers, and/or multiple antennas.

In some cases, a means for transmitting may include the transmitter 210. In some cases, a means for transmitting may include the transceiver 214. In some cases, a means for sending may include the transmitter 210. In some cases, a means for sending may include the transceiver 214. In some cases, a means for receiving may include the receiver 212. In some cases, a means for receiving may include the transceiver 214.

The wireless device 202 may also include a signal detector 218 that may be used in an effort to detect and quantify the level of signals received by the transceiver 214. The signal detector 218 may detect such signals as total energy, energy per subcarrier per symbol, power spectral density and other signals. The wireless device 202 may also include a digital signal processor (DSP) 220 for use in processing signals. The DSP 220 may be configured to generate a packet for transmission. In some aspects, the packet may comprise a physical layer data unit (PPDU).

The receiver 212 may be configured to wirelessly receive packets having different MAC header type. In some aspects, the receiver 212 is configured to detect a type of a MAC header used and process the packet accordingly, as discussed in further detail below.

The wireless device 202 may also include a signal detector 218 that may be used in an effort to detect and quantify the level of signals received by the transceiver 214. The signal detector 218 may detect such signals as total energy, energy per subcarrier per symbol, power spectral density and other signals. The wireless device 202 may also include a digital signal processor (DSP) 220 for use in processing signals. The DSP 220 may be configured to generate a data unit for transmission. In some aspects, the data unit may comprise a physical layer data unit (PPDU). In some aspects, the PPDU is referred to as a packet.

The wireless device 202 may further comprise a wake-up circuit 230 comprising a second, low power receiver 228. In one aspect, the low power receiver 228 may be configured to consume power that is lower than power normally consumed by the receiver 212 during operation. For example, the low power receiver 228 may be configured to consume on the order of 10×, 20×, 50×or 100×(or more) less power when operating as compared to the transceiver 214. In one aspect, the low power receiver 228 may be configured to receive signals using modulation/demodulation techniques such as on-off keying or frequency-shift keying (FSK) as compared to the transceiver 214 that may be configured to transmit and receive signals based on OFDM and other comparable techniques.

In some cases, a means for receiving may include the low power receiver 228.

The wireless device 202 may further comprise a user interface 222 in some aspects. The user interface 222 may comprise a keypad, a microphone, a speaker, and/or a display. The user interface 222 may include any element or component that conveys information to a user of the wireless device 202 and/or receives input from the user.

The various components of the wireless device 202 may be coupled together by a bus system 226. The bus system 226 may include a data bus, for example, as well as a power bus, a control signal bus, and a status signal bus in addition to the data bus. Those of skill in the art will appreciate the components of the wireless device 202 may be coupled together or accept or provide inputs to each other using some other mechanism.

Although a number of separate components are illustrated in FIG. 2, those of skill in the art will recognize that one or more of the components may be combined or commonly implemented. For example, the processor 204 may be used to implement not only the functionality described above with respect to the processor 204, but also to implement the functionality described above with respect to the signal detector 218 and/or the DSP 220. Further, each of the components illustrated in FIG. 2 may be implemented using a plurality of separate elements.

The wireless device 202 may comprise an AP 104 or a STA 106, and may be used to transmit and/or receive communications. That is, either AP 104 or STA 106 may serve as transmitter or receiver devices. Certain aspects contemplate signal detector 218 being used by software running on memory 206 and processor 204 to detect the presence of a transmitter or receiver.

A receiver of a STA 106, such as receiver 212, may consume a large amount of power during reception of packets from the AP 104 or another STA 106 or while waiting for a packet to be received. The amount of power that is consumed by the STA 106 may be reduced if the receiver is shut off for short intervals of time. For example, the receiver of STA 106 may be shut off or turned on at times agreed upon by the AP 104 and the STA 106. However, shutting off the receiver at an agreed upon time may not be flexible or efficient. The traffic pattern to and from the AP 104 may not be predictable such that the agreed upon time may occur when no packets are ready to be transmitted to the STA 106. Likewise, packets may be ready to be transmitted to the STA 106 when the receiver of the STA 106 is shut off.

In some implementations, some of the drawbacks described above may be minimized by including a second receiver in the STA 106. The second receiver may be the low power receiver 228 compatible with WLANs (e.g., the IEEE 802.11 protocol, etc.). The low power receiver 228 may be configured as an RF receiver. The low power receiver 228 may be referred to as a wake-up receiver or RF wake-up receiver. For example, the low power receiver 228 of the STA 106 may be able to communicate with the AP 104 (e.g., receive packets from the AP 104). As another example, the low power receiver 228 of the STA 106 may be able to communicate with other STAs, including those that are not associated with the STA 106. As is described herein, the use of a low power receiver 228 may reduce energy consumption.

Generally, a STA 106 (for example, wireless device 202) may include a low power receiver 228 that wakes up receiver 212 from a sleep or doze state when a message is received from the AP 104 or another STA 106. The low power receiver 228 may reserve medium for the receiver 212 to wake up and start receiving data. In further aspects, the low power receiver 228 may be turned on and off based on a schedule agreed upon with the AP 104. This may further reduce energy consumption.

In an implementation, the STA 106 may be in one of several states for a given power management (or power saving) mode the STA 106 is operating in. For example, the states may include an active state in which the STA 106 is "awake" and the STA 106 can receive (on its main signal receiver 212), process and transmit signals. In other words, in an active state, the receiver 212 of the STA 106 and any associated analog and/or digital circuits may be turned on such that the STA 106 can receive, process and transmit signals. When the STA 106 is in a PS mode, the STA 106 may be in an awake state or a doze state. In the doze state, the STA 106 cannot receive signals on the main signal receiver 212 and less power is consumed. To receive signals, the STA 106 may be placed in an awake state and typically it periodically awakens (for example, every 100 ms to check for beacons). In some implementations, the STA 106 can also operate in a PS low-power mode (PS-LP mode). In the PS-LP mode, a main signal receiver of a wireless device (for example, receiver 212 of device 202) does not normally awaken periodically, but instead the main receiver is caused to wake-up when the low-power receiver 228 receives a signal indicating to wake up the main receiver 212. Accordingly, in some implementations of a PS-LP mode, the states of the STA 106 can be awake, doze, or low-power (where a STA 106 does not wake-up periodically but instead is awoken by a signal received at a low-power receiver. In other implementations of a PS-LP mode, the states of the STA 106 can be awake or low-power, and not have a doze state.

In a PS mode, the STA 106 may be in an awake state (e.g., the receiver 212 and any associated analog and/or digital circuits are turned on) or may be in a doze state (e.g., the low power receiver 228 is turned on, but the receiver 212 and any associated analog and/or digital circuits are turned off). An AP 104 may not know if a wireless device is operating in a PS-LP mode. For example, legacy devices may not include the low-power receiver 228. Accordingly, communication protocols may be used that can make use of a PS-LP mode for devices that have such a capability, and also accommodate legacy devices to operate as they normally would.

In some implementations, when a wireless device 202 is in a legacy power saving mode, the wireless device is operational in one of several operational modes. For example, the operation modes may include legacy PS-Poll, unscheduled automatic power save delivery (U-APSD), scheduled automatic power save delivery (S-APSD), tunneled direct-link setup (TDLS) peer power save mode, and/or IEEE 802.11ah target wake times (TWT).

The legacy PS-Poll operation mode may include the STA 106 listening for a traffic indication map (TIM) transmitted by an AP 104. If the TIM indicates that there are bufferable units (BUs), the STA 106 may transmit a PS-Poll to the AP 104. The AP 104 may respond by sending data immediately or an acknowledgement followed by data at a later time. The AP 104 may also indicate if there are more BUs available.

The U-APSD operation mode may be similar to the PS-Poll operation mode. The STA 106 may transmit a "trigger frame," which may include any data frame (e.g., including QoS-Null) with an AC indication. The AP 104 may respond by transmitting data at a start of a service period and until the service period ends.

The S-APSD operation mode may include the STA 106 and the AP 104 agreeing on a scheduled delivery time of packets. At the agreed upon time, the AP 104 may send a frame (e.g., a CF-Ack) to check if the STA 106 is awake. If the STA 106 is awake, the AP 104 may start a service period as described above with respect to the U-APSD operation mode.

The TDLS peer power save mode may include one or more STAs 106 that agree upon a scheduled time at which both STAs 106 are awake. If data is exchanged, STAs 106 may go to sleep or doze when data indicates that a service period has ended.

The IEEE 802.11ah TWT operation mode may include a STA 106 that agrees with the AP 104 on a periodic window of time for uplink and/or downlink data transfer. The STA 106 may be sleeping or dozing outside of the periodic window of time.

The low-power state described above may also be referred to as an ultra-low power state. Accordingly, in a power save ultra-low power (PS-ULP) state (e.g., a PS-ULP mode), the STA 106 may be in an awake state, in a doze state, or in an ultra-low power (ULP) state (e.g., the low power receiver 228 is turned on but the RF wakeup circuit 230, the receiver 212, and any associated analog and/or digital circuits may be turned off). As described herein, it is assumed that the STA 106 is operating in the PS-ULP state.

In an implementation, in the PS-ULP mode, the STA 106 may transition from the doze state to the awake state, from the awake state to the doze state, from the doze state to the ULP state, from the ULP state to the awake state, from the ULP state to the doze state, and/or from the awake state to the ULP state.

The STA 106 may indicate to the AP 104 that it has transitioned from the doze state to the awake state by transmitting a PS-Poll or a trigger frame to the AP 104. The PS-Poll and/or the trigger frame may indicate that the STA 106 is ready to receive data.

The STA 106 may transition from the awake state to the doze state upon receiving a message from the AP 104 that indicates that the STA 106 can go to sleep. For example, the AP 104 may transmit a parameter indicating that additional data will not be transmitted to the STA 106 and/or the AP 104 may transmit a parameter indicating that the service period has ended. In an implementation, the AP 104 may assume the STA 106 transitioned into the doze state upon transmitting the parameter(s).

In an implementation, the STA 106 and the AP 104 may agree upon a period of time (e.g., a target ULP time (TUT)) during which the STA 106 may be in the ULP state. During the TUT, the AP 104 may transmit one or more ULP messages to the STA 106. In some implementations, the STA 106 may indicate a preferred setting (e.g., based on its wakeup time) by exchanging timing parameters with the AP 104.

The TUT may be defined relative to a time already agreed upon in the context of an S-APSD operation mode or an IEEE 802.11ah TWT operation mode. For example, the time agreed upon in the context of the S-APSD operation mode or the IEEE 802.11ah TWT operation mode may indicate a service period during which the AP 104 may transmit data to the STA 106 (e.g., a period during which the STA 106 is in an awake state). In some implementations, the TUT may occur before or after the service period. In other implementations, the TUT may overlap with the service period. While the TUT and the service period may overlap, the AP 104 may assume that the STA 106 is in the ULP state for the duration of the TUT.

If the AP 104 has BUs available for the STA 106, the AP 104 may transmit a ULP message during the TUT. In some implementations, the ULP message may be transmitted via a unicast transmission directed toward the STA 106. In other implementations, the ULP message may be transmitted via a groupcast transmission directed toward the STA 106 and other STAs. The ULP message may cause the STA 106 to transition from the ULP state to the awake state by the start of the next service period (e.g., the service period agreed upon in the context of the S-APSD operation mode, the IEEE 802.11ah TWT operation mode, etc.). In other words, the ULP message may function as a wakeup signal. If the ULP message is received during a TUT that overlaps with the service period, the STA 106 may immediately or nearly immediately transition into the awake state.

In some implementations, the AP 104 may ensure that the STA 106 transitioned into the awake state before transmitting any data packets during the service period. In an implementation, the AP 104 may send a frame QoS and a CF-Ack that indicates that the service period has not ended, and expect an acknowledgement from the STA 106. The STA 106 may then stay awake and wait for data packets to be received from the AP 104. In another implementation, the AP 104 may expect to receive a PS-Poll or a trigger frame from the STA 106 to indicate that the STA 106 is in the awake state. For example, the ULP message may act as a TIM and the STA 106 may operate as in a regular power saving mode known to one of skilled in the art.

In other implementations, the AP 104 may assume that the STA 106 is in the awake state starting a predetermined time after the ULP message is transmitted (e.g., 10 ms, 100 ms, etc.).

If the AP 104 has no BUs available for the STA 106, the AP 104 may still transmit a ULP message during the TUT. The ULP message may indicate that there is no data available for the STA 106. The ULP message may also allow for synchronization, such that the AP 104 and the STA 106 could schedule a new TUT and/or service period. The ULP message may also allow the STA 106 to transition from the ULP state to the doze state at an earlier time (e.g., before the end of the TUT).

If the AP 104 does not transmit a ULP message during the TUT, the STA 106 may remain in the ULP state until the TUT ends. After the TUT ends, the STA 106 may transition into the doze state. If the TUT overlaps with the service period, the STA 106 may transition into the awake state after the TUT ends.

In some implementations, the STA 106 may transition from the awake state to the doze state after the service period ends. In other implementations, the STA 106 may transition from the awake state to the ULP state after the service period ends if the STA 106 indicates that the STA 106 will always be in the ULP state when not in the awake state.

In other implementations, the STA 106 and the AP 104 may agree upon a given schedule, such as like in the context of the S-APSD operation mode or the IEEE 802.11ah TWT operation mode, and the STA 106 may indicate whether it will be in the active state or the ULP mode during the scheduled time. If the STA 106 is in the ULP mode, the AP 104 may behave as described above (e.g., the AP 104 may transmit a frame QoS and CF-Ack after the ULP message and expect an acknowledgement from the STA 106 or the AP 104 may expect a PS-Poll or trigger frame from the STA 106).

Figure 3:
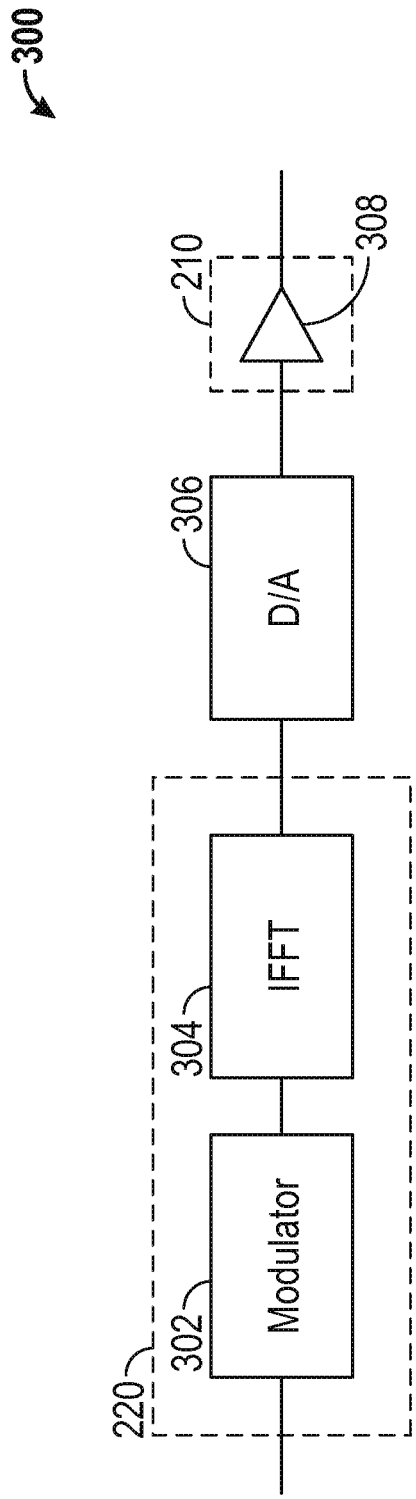
FIG. 3 is a functional block diagram of components that may be used in the wireless device of FIG. 2 to transmit wireless communications.

As discussed above, the wireless device 202 may comprise an AP 104 or a STA 106. FIG. 3 illustrates various components that may be used to transmit wireless communications, such as OFDM communications.

The wireless device 300 of FIG. 3 may comprise a modulator 302 configured to modulate bits for transmission.

For example, the modulator 302 may determine a plurality of symbols from bits received from the processor 204 (FIG. 2) or the user interface 222 (FIG. 2), for example by mapping bits to a plurality of symbols according to a constellation. The bits may correspond to user data or to control information. In some aspects, the bits are received in codewords. In one aspect, the modulator 302 comprises a QAM (quadrature amplitude modulation) modulator, for example a 16-QAM modulator or a 64-QAM modulator. In other aspects, the modulator 302 comprises a binary phase-shift keying (BPSK) modulator or a quadrature phase-shift keying (QPSK) modulator.

The wireless device 300 may further comprise a transform module 304 configured to convert symbols or otherwise modulated bits from the modulator 302 into a time domain. In FIG. 3, the transform module 304 is illustrated as being implemented by an inverse fast Fourier transform (IFFT) module. In some implementations, there may be multiple transform modules (not shown) that transform units of data of different sizes. In some implementations, the transform module 804 may be itself configured to transform units of data of different sizes. For example, the transform module 304 may be configured with a plurality of modes, and may use a different number of points to convert the symbols in each mode. For example, the IFFT may have a mode where 32 points are used to convert symbols being transmitted over 32 tones (i.e., subcarriers) into a time domain, and a mode where 64 points are used to convert symbols being transmitted over 64 tones into a time domain. The number of points used by the transform module 804 may be referred to as the size of the transform module 804. It should be appreciated that the transform module 804 may be configured to operate according to additional modes where 128 points, 256 points, 512 points, and 1024 points are used, and the like.

In FIG. 3, the modulator 302 and the transform module 304 are illustrated as being implemented in the DSP 220. In some aspects, however, one or both of the modulator 302 and the transform module 304 are implemented in the processor 204 or in another element of the wireless device 202 (e.g., see description above with reference to FIG. 2).

As discussed above, the DSP 220 may be configured to generate a data unit for transmission. In some aspects, the modulator 302 and the transform module 304 may be configured to generate a data unit comprising a plurality of fields including control information and a plurality of data symbols.

Returning to the description of FIG. 3, the wireless device 300 may further comprise a digital to analog converter 306 configured to convert the output of the transform module into an analog signal. For example, the time-domain output of the transform module 306 may be converted to a baseband OFDM signal by the digital to analog converter 306. The digital to analog converter 306 may be implemented in the processor 204 or in another element of the wireless device 202 of FIG. 2. In some aspects, the digital to analog converter 306 is implemented in the transceiver 214 (FIG. 2) or in a data transmit processor.

The analog signal may be wirelessly transmitted by the transmitter 210. The analog signal may be further processed before being transmitted by the transmitter 210, for example by being filtered or by being upconverted to an intermediate or carrier frequency. In the aspect illustrated in FIG. 3, the transmitter 210 includes a transmit amplifier 308. Prior to being transmitted, the analog signal may be amplified by the transmit amplifier 308. In some aspects, the amplifier 308 comprises a low noise amplifier (LNA).

The transmitter 210 is configured to transmit one or more packets or data units in a wireless signal based on the analog signal. The data units may be generated using the processor 204 (FIG. 2) and/or the DSP 220, for example using the modulator 302 and the transform module 304 as discussed above. Data units that may be generated and transmitted as discussed above are described in additional detail below.

Figure 4:
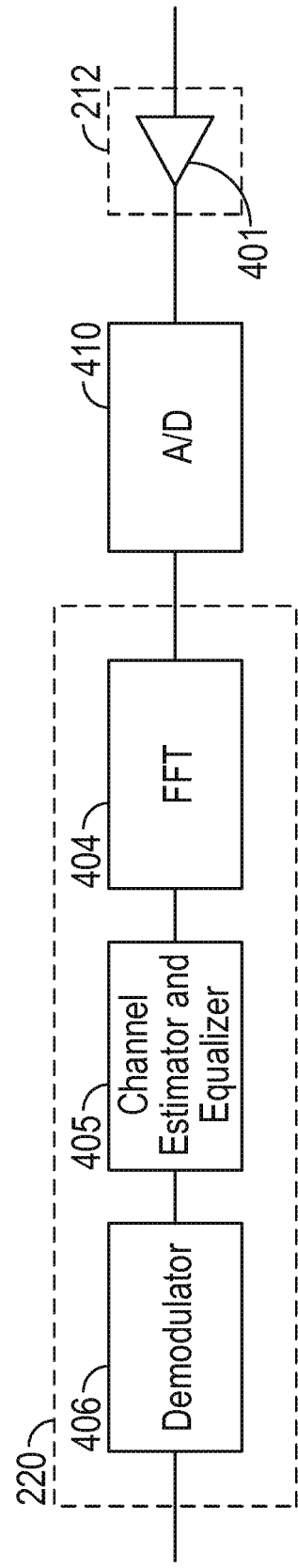
FIG. 4 is a functional block diagram of components that may be used in the wireless device of FIG. 2 to receive wireless communications.

FIG. 4 illustrates various components that may be utilized in the wireless device 202 of FIG. 2 to receive wireless communications. The components illustrated in FIG. 4 may be used, for example, to receive OFDM communications. In some aspects, the components illustrated in FIG. 4 are used to receive data units over a bandwidth of equal to or less than 1 MHz. For example, the components illustrated in FIG. 4 may be used to receive data units transmitted by the components discussed above with respect to FIG. 3.

The receiver 212 of wireless device 400 is configured to receive one or more packets or data units in a wireless signal. Data units that may be received and decoded or otherwise processed as discussed below.

In the aspect illustrated in FIG. 4, the receiver 212 includes a receive amplifier 401. The receive amplifier 401 may be configured to amplify the wireless signal received by the receiver 412. In some aspects, the receiver 212 is configured to adjust the gain of the receive amplifier 401 using an automatic gain control (AGC) procedure. In some aspects, the automatic gain control uses information in one or more received training fields, such as a received short training field (STF) for example, to adjust the gain. Those having ordinary skill in the art will understand methods for performing AGC. In some aspects, the amplifier 401 comprises an LNA.

The wireless device 400 may comprise an analog to digital converter 410 configured to convert the amplified wireless signal from the receiver 212 into a digital representation thereof. Further to being amplified, the wireless signal may be processed before being converted by the digital to analog converter 410, for example by being filtered or by being downconverted to an intermediate or baseband frequency. The analog to digital converter 410 may be implemented in the processor 204 (FIG. 2) or in another element of the wireless device 400. In some aspects, the analog to digital converter 410 is implemented in the transceiver 214 (FIG. 2) or in a data receive processor.

The wireless device 400 may further comprise a transform module 404 configured to convert the representation of the wireless signal into a frequency spectrum. In FIG. 4, the transform module 404 is illustrated as being implemented by a fast Fourier transform (FFT) module. In some aspects, the transform module may identify a symbol for each point that it uses. As described above with reference to FIG. 3, the transform module 404 may be configured with a plurality of modes, and may use a different number of points to convert the signal in each mode. For example, the transform module 404 may have a mode where 32 points are used to convert a signal received over 32 tones into a frequency spectrum, and a mode where 64 points are used to convert a signal received over 64 tones into a frequency spectrum. The number of points used by the transform module 404 may be referred to as the size of the transform module 404. In some aspects, the transform module 404 may identify a symbol for each point that it uses. It should be appreciated that the transform module 404 may be configured to operate according to additional modes where 128 points, 256 points, 512 points, and 1024 points are used, and the like.

The wireless device 400 may further comprise a channel estimator and equalizer 405 configured to form an estimate of the channel over which the data unit is received, and to remove certain effects of the channel based on the channel estimate. For example, the channel estimator 405 may be configured to approximate a function of the channel, and the channel equalizer may be configured to apply an inverse of that function to the data in the frequency spectrum.

The wireless device 400 may further comprise a demodulator 406 configured to demodulate the equalized data. For example, the demodulator 406 may determine a plurality of bits from symbols output by the transform module 404 and the channel estimator and equalizer 405, for example by reversing a mapping of bits to a symbol in a constellation. The bits may be processed or evaluated by the processor 204 (FIG. 2), or used to display or otherwise output information to the user interface 222 (FIG. 2). In this way, data and/or information may be decoded. In some aspects, the bits correspond to codewords. In one aspect, the demodulator 406 comprises a QAM (quadrature amplitude modulation) demodulator, for example a 16-QAM demodulator or a 64-QAM demodulator. In other aspects, the demodulator 906 comprises a binary phase-shift keying (BPSK) demodulator or a quadrature phase-shift keying (QPSK) demodulator.

In FIG. 4, the transform module 404, the channel estimator and equalizer 405, and the demodulator 406 are illustrated as being implemented in the DSP 220. In some aspects, however, one or more of the transform module 404, the channel estimator and equalizer 405, and the demodulator 406 are implemented in the processor 204 (FIG. 2) or in another element of the wireless device 202 (FIG. 2).

As discussed above, the wireless signal received at the receiver 212 comprises one or more data units. Using the functions or components described above, the data units or data symbols therein may be decoded evaluated or otherwise evaluated or processed. For example, the processor 204 (FIG. 2) and/or the DSP 220 may be used to decode data symbols in the data units using the transform module 404, the channel estimator and equalizer 405, and the demodulator 406.

Data units exchanged by the AP 104 and the STA 106 may include control information or data, as discussed above. At the physical (PHY) layer, these data units may be referred to as physical layer protocol data units (PPDUs). In some aspects, a PPDU may be referred to as a packet or physical layer packet. Each PPDU may comprise a preamble and a payload. The preamble may include training fields and a SIG field. The payload may comprise a Media Access Control (MAC) header or data for other layers, and/or user data, for example. The payload may be transmitted using one or more data symbols. The systems, methods, and devices herein may utilize data units with training fields whose peak-to-power ratio has been minimized.

The wireless device 300 shown in FIG. 3 shows an example of a single transmit chain to be transmitted over an antenna. The wireless device 400 shown in FIG. 4 shows an example of a single receive chain to be received over an antenna. In some implementations, the wireless device 300 or 400 may implement a portion of a MIMO system using multiple antennas to simultaneously transmit data.

Accordingly, certain implementations are directed to sending wireless signals using a variety of different bandwidths in different frequency ranges. For example, in one exemplary implementation, a symbol may be configured to be transmitted or received using a bandwidth of 1 MHz. The wireless device 202 of FIG. 2 may be configured to operate in one of several modes. In one mode, symbols such as OFDM symbols may be transmitted or received using a bandwidth of 1 MHz. In another mode, symbols may be transmitted or received using a bandwidth of 2 MHz. Additional modes may also be provided for transmitting or receiving symbols using a bandwidth of 4 MHz, 8 MHz, 16 MHz, and the like. The bandwidth may also be referred to as the channel width. In addition, additional modes or configuration are possible such as for example of using bandwidths of 20 MHz, 40 MHz, 80 MHz, and the like in the 2.4 GHz band or the 5 GHz. Band.

Figure 5A:
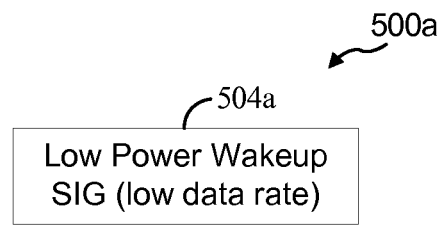
FIG. 5A shows an example of a low power wake up signal, in accordance with an implementation.

FIG. 5A shows a possible structure for a low power wake-up signal 500a. The wake-up signal 500a may be a single-phase signal 504a that carries an encoded signal. The wake-up signal 500a may be transmitted using on-off keying, frequency-shift keying, or the like. For example, if using something similar to on-off keying, the wake-up signal 500a may be a sequence represented as zeros and ones. When the wake-up circuit 230 and low power receiver 228 detect a particular sequence of zeros and ones, the wake-up circuit 230 may trigger turning on the transceiver 214. The wake-up circuit 230 may have multiple correlators to try to detect each possible signal.

Figure 5B:
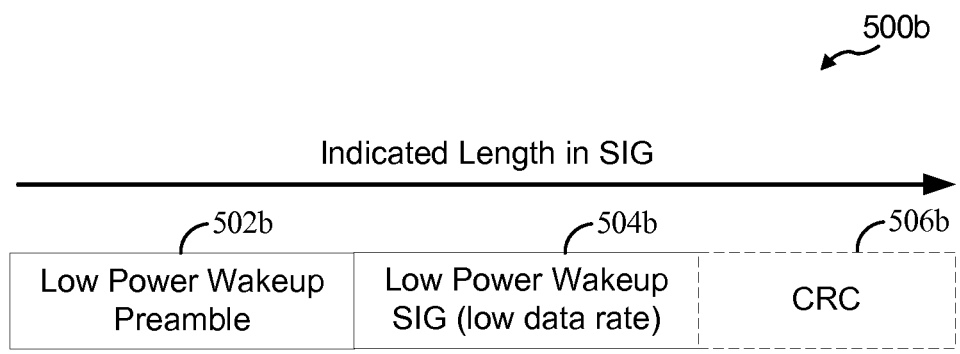
FIG. 5B shows another example of a low power wake up signal.

FIG. 5B shows another possible structure for a low power wake-up signal 500b. The low power wake-up signal 500b includes at least two portions. This first portion 502b includes a 'global' sequence (robust), i.e. like a 'low power wake up preamble.' This may allow the low power receiver 228 to detect that a low power signal 500b is coming up. The second portion 504b, following the first portion 502a, includes encoded information. The encoded information may indicate the identifier of the STA 106 to be woken up or other information. Optionally, there may be a third portion 506b including a checksum for error detection. The first portion 502b may be formed using an on-off keying, frequency-shift keying, or other modulated preamble sequence that may provide the timing and detection. In some implementations, the second portion 504b may include data that may be spread and/or encoded. Spreading and/or encoding may be agreed by transmitting and receiving STAs 106.

In addition, the low power wake-up signal 500a, 500b may be provided in a sequence of transmissions that provide for coexistence. For example, an additional 'Wakeup PPDU format' preamble may be provided, such as an new wake-up PPDU format for a 802.11 OFDM PHY preamble followed by the new low power wake-up signal. The OFDM PHY preamble may indicate a duration (in SIG field) that makes 802.11 STAs 106 defer for the duration of the signal and the wake-up time for the receiver 212. The 802.11 STAs 106 may assume there is a regular packet coming up. As such, reception of the payload may fail, but the 802.11 STA 106 defers for the time indicated in PHY preamble. Furthermore, the low power wake-up signal 500a, 500b may be provided to have up to ~20 ms signaling duration to match the duration of a typical PPDU. In addition, Null Packets (QoS Null frames to the STA 106) may be sent during the wake-up time (e.g., period of time the transceiver 214 of the low power receiver 228 needs to be turned on) to make sure other devices honor contention based mechanisms for accessing the channel. In addition, there may be multiple wake-up signals protected by a same PHY preamble. In addition, the PHY preamble may have a bandwidth that is narrower than an 802.11 preamble.

Beacons typically include traffic indication map (TIM) elements that indicates if there are pending buffered frames for each STA 106. Beacons are typically sent at a low transmission rate to reach a larger geographic range. As a result, beacon durations may be long. Longer duration signals require longer receive time and higher energy consumption. TIM broadcast mechanisms are sent at a higher transmission rate. TIM broadcast mechanisms allow a STA 106 to request an AP 104 to periodically send a dedicated frame including only the TIM.

For some implementations, in addition to receiving paging information via scheduled beacons, the STA 106 may send a paging broadcast request frame to an AP 104, requesting a type of paging messages and other requested characteristics of the paging. In one aspect, the AP 104 responds with a paging broadcast response frame indicating acceptance of the request, transmission times, offset from beacon transmission times, and/or the rate at which it will send the paging messages. The AP 104 may send the paging messages at a rate of transmission that is higher than the beacon transmission rate.

FIG. 6 is a block diagram illustrating an exemplary paging mode request 600, sometimes referred to as a requested paging message. In one implementation, a paging broadcast mode request 600 may include one or more of an element ID field 604, length field 608, a paging broadcast interval field 612, a control field 616, a minimum offset field 620, and/or a maximum offset field 624.

Furthermore, the paging mode request 600 may include a control field 616. One or more of the bits in the control field 616 may be used to indicate a type of paging message that is being requested by the STA 106. For example, in one aspect, the STA 106 can select between at least one of two types of paging messages, e.g., an orthogonal frequency division multiplexed message including TIM data and an encoded on-off keyed message including paging information, such as that described above with respect to FIG. 5A or 5B. The control field 616 may also indicate a maximum rate for the transmission of the paging message.

The minimum offset field 620 is the identified minimum time offset with respect to the TBTT. The maximum offset field 624 is the identified maximum time offset with respect to the TBTT.

In response to receiving a paging mode request 600, the AP 104 may transmit a paging broadcast response 700 including one or more of an element ID field 704, a length field 708, a status identifier field 712, a paging broadcast interval 716, a paging broadcast offset 720, a high rate limit 724, a low rate limit 728, and/or one or more group identifiers 732. The values in the status field 712 identifies whether the AP 104 accepted the received type of paging message requested by the STA 106.

The paging broadcast interval field 716 identifies an integer number of beacons that are to be transmitted prior to the transmission of the paging information. The AP 104 transmits paging messages at an integer multiple of the period that the transmitter is configured to transmit beacons, wherein the integer corresponds to the broadcast interval field 716 value.

The paging broadcast offset field 720 identifies the timing of transmission by indicating the period of time after the transmission of the beacon that occurs prior to sending the supplemental paging information. The high rate field 724 indicates a maximum transmission rate that will be used to transmit the requested paging information, unless an NDP page is used. The low rate field 728 indicates a minimum transmission rate that will be used to transmit the requested paging information, unless an NDP page is used.

At least one group identifier field 732 is used by the AP 104 to indicate whether the STA 106 is to be assigned to a group and identifies which group the STA 106 has been assigned. Each group contains at least one recipient. Subsequently, when a STA 106 receives a TIM page addressed to one of its GIDs 732, the STA 106 may conclude that the paging message is addressed to it. The recipient STA 106 may receive the message and process it.

Figure 8:
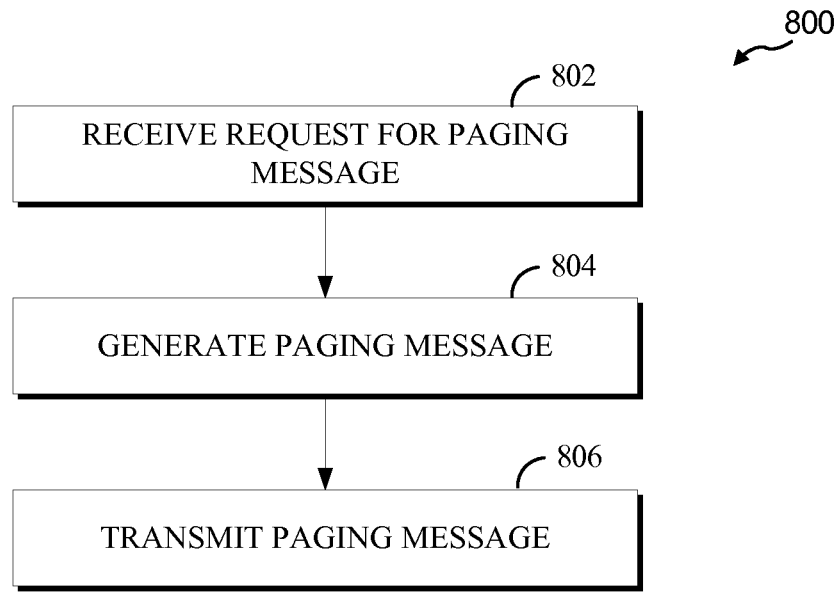
FIG. 8 is a flowchart illustrating a process of receiving a paging mode request from a station.

FIG. 8 is a flowchart illustrating an exemplary process for processing paging request messages performed by the wireless device 202. In one implementation, a process 800 of FIG. 8 is performed by the AP 104 (FIG. 1).

Starting at a state 802, the AP 104 receives a paging mode request from a STA 106 requesting one of a plurality of selected types of paging messages. For example, the selected types can include a TIM frame, an NDP message (described above) or an on-off keyed message (described above with respect to FIGS. 5A and 5B). An example paging mode request is described above with reference to FIG. 6. Next, at state 804, the AP 104 generates a message responding to the paging mode request and which identifies one of the paging modes. It is to be noted that the AP 104 may not agree to transmit paging messages in accordance with the mode that has been requested by the STA 106. Next, the AP 104 transmits the generated response message.

Continuing to a state 806, upon receipt of information for the STA, the AP 104 transmits a paging message to the STA 106 in accordance with mode of paging identified the response message.

Figure 9:
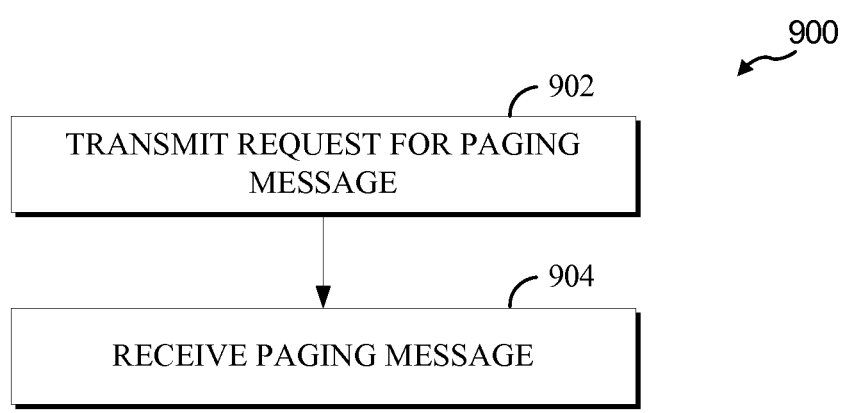
FIG. 9 is a flowchart illustrating a process of generating a paging mode request.

FIG. 9 is a flowchart illustrating an exemplary process for generating a paging request message. In one implementation, a process 900 of FIG. 9 is performed by one of the STAs 106 (FIG. 1).

Starting at a state 902, the STA sends a paging mode request to the AP 104. For example, the STA 106 can request to receive additional TIM updates, or, alternatively, a low power paging that can include the NDP messages (described above) or an on-off keyed (OOK) message (described above with respect to FIGS. 5A and 5B). An exemplary paging mode request message is described below with respect to FIG. 6.

Proceeding to a state 904, the STA 106 listens for paging messages in accordance with the identified mode that was selected by the AP 104. An exemplary paging mode response message is described below with respect to FIG. 7. For example, if the AP 104 method for identifying paging mode identified that the paging message will include an OOK message, the STA 106 may activate a low power receiver 228 that is configured to receive such messages. The STA 106 receives messages in accordance with the paging mode that was identified in state 906.

Replacing beacons with pages may reduce overall energy consumption by the STAs 106. With an optimized low power receiver 228, very significant energy saving, especially at low latencies is possible, estimated for a 5-10× battery life improvement at 100 ms latency, and 2-5× battery life improvement at 2 s latency.

Figure 10:
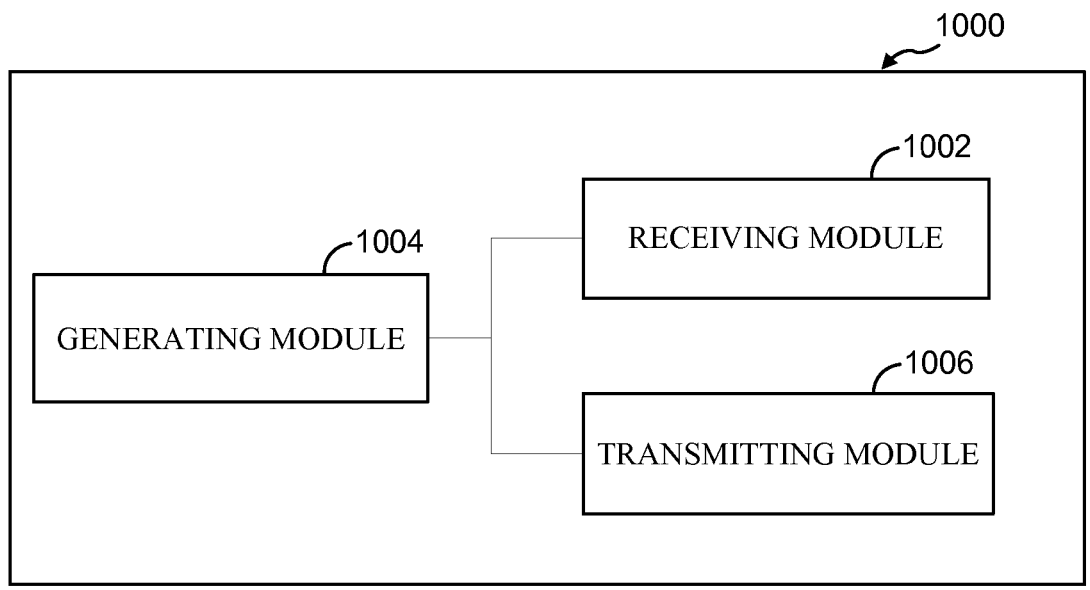
FIG. 10 shows a functional block diagram for a wireless communication apparatus.

FIG. 10 shows a functional block diagram for a wireless communication apparatus 1000. In one aspect, apparatus 1000 may be equivalent to device 202, disclosed in FIG. 2. Those skilled in the art will appreciate that a wireless communication apparatus may have more components than the simplified wireless communication apparatus 1000 shown in FIG. 10. The wireless communication apparatus 1000 shown includes only those components useful for describing some prominent features of implementations within the scope of the claims.

The wireless communication apparatus 1000 may include a receiving module 1002. The receiving module 1002 may include receiver 212 of FIG. 2. The receiving module performs one or more of the functions described with respect to block 802 of FIG. 8. In one aspect, a means for receiving a request for one of a plurality of types of paging messages may include the receiving module 1002.

The apparatus 1000 may further include a generating module 1004. The generating module 1004 may include processor 204 of FIG. 2. The generating module performs one or more of the functions described with respect to block 804 of FIG. 8. In one aspect, a means for generating the requested one of the plurality of types of paging messages may include generating module 1004. The apparatus 1000 may further include a transmitting module 1006.

The transmitting module 1006 may include transmitter 210 of FIG. 2. The transmitting module performs one or more of the functions described with respect to block 806 of FIG. 8. In one aspect, a means for transmitting the generated one of the plurality of types of paging messages may include the transmitting module 1006.

Figure 11:
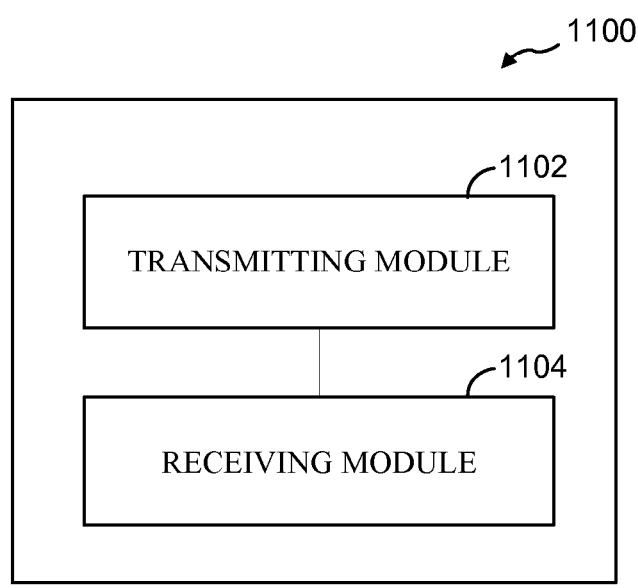
FIG. 11 shows a functional block diagram for a wireless communication apparatus.

FIG. 11 shows a functional block diagram for a wireless communication apparatus 1100. In one aspect, apparatus 1100 may be equivalent to device 202, disclosed in FIG. 2. Those skilled in the art will appreciate that a wireless communication apparatus may have more components than the simplified wireless communication apparatus 1100 shown in FIG. 11. The wireless communication apparatus 1100 shown includes only those components useful for describing some prominent features of implementations within the scope of the claims.

The wireless communication apparatus 1100 may include transmitting module 1102. The transmitting module 1102 may include transmitter 210 of FIG. 2. The transmitting module 1102 performs one or more of the functions described with respect to block 902 of FIG. 9. In one aspect, a means for transmitting a request for one of a plurality of types of paging messages may include transmitting module 1102.

The apparatus 1100 may further include a receiving module 1104. The receiving module 1104 may include low power receiver 228 of FIG. 2. The receiving module 1104 performs one or more of the functions described with respect to block 904 of FIG. 9. The means for receiving the requested type of paging message may include receiving module 1104.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like. Further, a "channel width" as used herein may encompass or may also be referred to as a bandwidth in certain aspects.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

In one or more aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Thus, in some aspects computer readable medium may comprise non-transitory computer readable medium (e.g., tangible media). In addition, in some aspects computer readable medium may comprise transitory computer readable medium (e.g., a signal). Combinations of the above should also be included within the scope of computer-readable media.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to aspects of the present disclosure, other and further aspects of the disclosure may be devised without departing from the basic scope thereof, and the scope thereof is determined by the claims that follow.

What is claimed is:

1. An apparatus for wireless communication in a wireless communications system comprising at least one wireless node, comprising:
    a receiver configured to receive a paging message request from a first wireless node of the at least one wireless node, the paging message request comprising an indication of a paging message type;
    a processing system configured to generate a paging message based on the paging message type, the paging message having a size that is proportional to a number of at least one wireless node, indicating whether the apparatus has data for transmission to the at least one wireless node and notifying a second receiver of the first wireless node to alter a power state of a first receiver of the wireless node; and
    a transmitter configured to transmit the paging message.

2. The apparatus of claim 1, wherein the transmitter is configured to transmit a response to the paging message request.

3. The apparatus of claim 2, wherein the response indicates acceptance of the paging message request, and wherein the paging message request comprises at least one of a length of the paging message or a timing of transmission of the paging message configured to allow the apparatus to coordinate a reception of the paging message by the second receiver of the wireless node to minimize a time necessary for the reception and increase power saving for the wireless node.

4. The apparatus of claim 2, wherein the response is configured to include at least one group identifier for at least one recipient of the paging message.

5. The apparatus of claim 1, wherein the transmitter is configured to transmit the paging message at an integer multiple of a period that the transmitter is configured to transmit beacons.

6. The apparatus of claim 1, wherein the transmitter is configured to transmit the paging message at a rate identified by a response to the paging message request, and wherein the rate identified by the paging message request is at a higher transmission rate than a beacon transmission rate.

7. The apparatus of claim 1, wherein the paging message comprises a traffic identification map broadcast message.

8. The apparatus of claim 1, wherein the paging message comprises a null data packet message.

9. The apparatus of claim 1, wherein the paging message comprises an encoded on-off keyed message.

10. The apparatus of claim 1, wherein the paging message comprises an orthogonal frequency division multiplexed message.

11. An apparatus for wireless communication in a wireless communications system comprising at least one wireless node, comprising;
    a transmitter configured to transmit, to a first wireless node of the at least one wireless node, a paging message request comprising an indication of a paging message type to be used for generating a paging message by the first wireless node, the paging message having a size that is proportional to a number of at least one wireless node; and
    a receiver capable of operating at a lower power than another receiver of the apparatus, wherein the receiver is configured to receive the paging message,
    wherein the paging message indicates whether the at least one wireless node has data for transmission to the apparatus, and the receiver is further configured to alter a power state of the other receiver of the apparatus based on the paging message.

12. The apparatus of claim 11, wherein the paging message request includes an indication of a transmission rate that is less than a maximum rate of the receiver.

13. The apparatus of claim 11, wherein the paging message request identifies a minimum time offset from reception of the beacon, and wherein the receiver is configured to receive the paging message at the minimum time offset.

14. The apparatus of claim 11, wherein the paging message request identifies a maximum time offset from reception of the beacon, and wherein the receiver is configured to receive the paging message at the maximum time offset.

15. A method of wireless communication, in a wireless communications system comprising at least one wireless node, comprising:
    receiving a paging message request from a first wireless node of the at least one wireless node, the paging message request comprising an indication of a paging message type;

generating a paging message based on the paging message type, the paging message having a size that is proportional to a number of at least one wireless node, the paging message indicating whether there is data for transmission to the at least one wireless node and notifying a second receiver of the first wireless node to alter a power state of a first receiver of the wireless node; and transmitting the paging message.

16. The method of claim 15, further comprising sending a response to the paging message request.

17. The method of claim 16, wherein the response indicates acceptance of the paging message request, and wherein the paging message request comprises at least one of a length of the paging message or a timing of transmission of the paging message configured to allow coordination of a reception of the paging message by the second receiver of the wireless node.

18. The method of claim 16, wherein the response is configured to include at least one group identifier for at least one recipient of the paging message.

19. The method of claim 15, wherein transmitting the paging message occurs at an integer multiple of a period for transmitting beacons.

20. The method of claim 15, wherein transmitting the paging message is at a rate identified by the paging message request, wherein the rate identified by the paging message request is at a higher transmission rate than a beacon transmission rate.

21. The method of claim 15, wherein the paging message comprises a traffic identification map broadcast message.

22. The method of claim 15, wherein the paging message comprises a null data packet message.

23. The method of claim 15, wherein the paging message comprises an encoded on-off keyed message.

24. The method of claim 15, wherein the paging message comprises an orthogonal frequency division multiplexed message.

25. A method of wireless communication in a wireless communications system comprising at least one wireless node, comprising: transmitting, from an apparatus to a wireless node, a paging message request comprising an indication of a paging message type to be used by the least one wireless node for generating a paging message, the paging message having a size that is proportional to a number of at least one wireless node;

receiving the paging message with a first receiver of the apparatus capable of operating at a lower power than a second receiver of the apparatus, wherein the paging message indicates whether there is data for transmission from the wireless node, and wherein the first receiver is configured to receive the paging message; and altering a power state of the second receiver based on the paging message, wherein the alteration is initiated by the first receive.

26. The method of claim 25, further comprising receiving a response to the paging message request, wherein the response to the paging message request includes an indication of a transmission rate that is less than a maximum rate of the first receiver.

27. The method of claim 25, wherein the paging message request identifies a minimum time offset from reception of the beacon, and wherein receiving the paging message is at the minimum time offset.

28. The method of claim 25, wherein the paging message request identifies a maximum time offset from the beacon, and wherein receiving the paging message is at the maximum time offset.

29. A non-transitory computer readable medium encoded thereon with instructions that when executed cause an apparatus to perform a method of wireless communication in a wireless communications system comprising at least one wireless node, said method comprising:

receiving a paging message request from a first wireless node of the at least one wireless node, the paging message request comprising an indication of a paging message type;

generating a paging message based on the paging message type, the paging message having a size that is proportional to a number of at least one wireless node, the paging message indicating whether the apparatus has data for transmission to the at least one wireless node and notifying a second receiver of the wireless node to alter a power state of a first receiver of the wireless node; and transmitting the paging message.

30. A non-transitory computer readable medium encoded thereon with instructions that when executed cause an apparatus to perform a method of wireless communication in a wireless communications system comprising at least one wireless node, said method comprising:

transmitting a paging message request to a wireless node comprising an indication of a paging message type to be used for generating a paging message by the first wireless node, the paging message having a size that is proportional to a number of at least one wireless node;

receiving the paging message in a signal at the apparatus, the paging message indicating whether the first wireless node has data for transmission to the apparatus, the apparatus comprising a first receiver and a second receiver capable of operating at a lower power than the first receiver; and altering a power state of the first receiver based on the paging message, wherein the alteration is initiated by the second receiver.

31. An apparatus for wireless communication in a wireless communications system comprising at least one wireless node, comprising:

means for receiving a paging message request from a first wireless node of the at least one wireless node, the paging message request comprising an indication of a paging message type;

means for generating a paging message based on the paging message type, the paging message having a size that is proportional to a number of at least one wireless node, the paging message indicating whether the apparatus has data for transmission to the at least one wireless node and notifying a second receiver of the first wireless node to alter a power state of a first receiver of the wireless node; and means for transmitting the paging message.

32. The apparatus of claim 31, wherein the response indicates acceptance of at least the paging message request, and wherein the paging message request comprises at least one of a length of the paging message or a timing of transmission of the paging message configured to allow the apparatus to coordinate a reception of the paging message by the second receiver of the wireless node.

33. The apparatus of claim 31, wherein the response is configured to include at least one group identifier for at least one recipient of the paging message.

34. The apparatus of claim 31, wherein the means for transmitting the paging message comprises means for transmitting the paging message at an integer multiple of a period for transmitting beacons.

35. The apparatus of claim 31, wherein the means for transmitting the paging message comprises means for transmitting the paging message at a rate identified by the paging message request, wherein the rate identified by the paging message request is at a higher transmission rate than a beacon transmission rate.

36. The apparatus of claim 31, wherein the paging message comprises a traffic identification map broadcast message.

37. The apparatus of claim 31, wherein the paging message comprises a null data packet message.

38. The apparatus of claim 31, wherein the paging message comprises an encoded on-off keyed message.

39. The apparatus of claim 31, wherein the paging message comprises an orthogonal frequency division multiplexed message.

40. An apparatus for wireless communication, in a wireless communications system comprising at least one wireless node, comprising:
  means for transmitting a paging message request to a first wireless node of the at least one wireless node, comprising an indication of a paging message type to be used for generating a paging message by the first wireless node, the paging message having a size that is proportional to a number of at least one wireless node;
  means for receiving the paging message, the means for receiving capable of operating at a lower power than another receiver in the apparatus,
  wherein the means for receiving is configured to receive the paging message, wherein the paging message indicates whether the at least one wireless node has data for transmission to the apparatus; and
  means for altering a power state of the other receiver based on the paging message, wherein the alteration is initiated by the means for receiving the paging message.

41. An access point, in a wireless communications system comprising at least one wireless node, comprising:
  at least one antenna;
  a receiver configured to receive, via the at least one antenna, a paging message request from a first wireless node of the at least one wireless node, the paging message request comprising an indication of a paging message type;
  a processing system configured to generate a paging message based on the paging message type, the paging message having a size that is proportional to a number of at least one wireless node, the paging message indicating whether the apparatus has data for transmission to the at least one wireless node and notifying a second receiver of the at least one wireless node to alter a power state of a first receiver of the wireless node: and
  a transmitter configured to transmit, via the at least one antenna, the paging message.

42. An access terminal, in a wireless communications system comprising at least one wireless node, comprising:
  at least one antenna;
  a transmitter configured to transmit, via the at least one antenna to a first wireless node of the at least one wireless node, a paging message request comprising an indication of a paging message type to be used for generating a paging message by the first wireless node, the paging message having a size that is proportional to a number of at least one wireless node; and
  a receiver capable of operating at a lower power than another receiver of the access terminal, wherein the receiver is configured to receive, via the at least one antenna, the paging message,
  wherein the paging message indicates whether the at least one wireless node has data for transmission to the access terminal, and
  the receiver is further configured to after a power state of the other receiver of the access terminal based on the paging message.

43. The apparatus of claim 1, wherein the second receiver is configured to consume less energy than the first receiver.

44. The apparatus of claim 11, wherein the receiver is configured to consume less energy than the other receiver.

45. The apparatus of claim 1, wherein the paging message comprises a bitmap that indicates a power state the first receiver should be in to be able to receive data.

46. The apparatus of claim 11, wherein the paging message comprises a bitmap that indicates a power state the other receiver should be in to be able to receive data and wherein; the receiver is further configured to alter a the power state of the other receiver of the apparatus based on the bitmap.

* * * * *